(12) United States Patent
Edwards et al.

(10) Patent No.: US 11,505,685 B2
(45) Date of Patent: *Nov. 22, 2022

(54) HIGH IMPACT POLYPROPYLENE IMPACT COPOLYMER

(71) Applicant: ExxonMobil Chemical Patents Inc., Baytown, TX (US)

(72) Inventors: Todd S. Edwards, League City, TX (US); Christopher G. Bauch, Seabrook, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 297 days.

This patent is subject to a terminal disclaimer.

(21) Appl. No.: 16/624,630

(22) PCT Filed: Apr. 11, 2018

(86) PCT No.: PCT/US2018/027090
§ 371 (c)(1),
(2) Date: Dec. 19, 2019

(87) PCT Pub. No.: WO2019/005262
PCT Pub. Date: Jan. 3, 2019

(65) Prior Publication Data
US 2020/0131353 A1   Apr. 30, 2020

Related U.S. Application Data

(60) Provisional application No. 62/525,354, filed on Jun. 27, 2017.

(51) Int. Cl.
| C08L 23/16 | (2006.01) |
| C08F 210/16 | (2006.01) |
| C08L 23/12 | (2006.01) |
| C08F 2/01 | (2006.01) |
| C08F 4/02 | (2006.01) |
| C08F 4/659 | (2006.01) |
| C08F 299/00 | (2006.01) |
| C08L 23/14 | (2006.01) |
| C08F 2/00 | (2006.01) |

(52) U.S. Cl.
CPC .............. *C08L 23/12* (2013.01); *C08F 2/01* (2013.01); *C08F 4/02* (2013.01); *C08F 4/65916* (2013.01); *C08F 210/16* (2013.01); *C08F 299/00* (2013.01); *C08L 23/14* (2013.01); *C08L 23/16* (2013.01); *C08F 2/001* (2013.01); *C08F 2500/12* (2013.01); *C08F 2500/17* (2013.01); *C08F 2500/30* (2021.01); *C08L 2207/02* (2013.01)

(58) Field of Classification Search
CPC .... C08F 210/16; C08F 2/001; C08F 2500/12; C08F 2500/30; C08L 23/16; C08L 2207/02
See application file for complete search history.

(56) References Cited

U.S. PATENT DOCUMENTS

| 5,422,400 A | 6/1995 | Kamiyama et al. |
| 6,054,542 A | 4/2000 | Kojoh et al. |
| 6,147,152 A | 11/2000 | Kanome et al. |
| 6,403,708 B2 | 6/2002 | Moriya et al. |
| 6,759,475 B2 | 7/2004 | Sakai et al. |
| 6,818,583 B1 | 11/2004 | Morini et al. |
| 7,081,493 B2 | 7/2006 | Kawai et al. |
| 7,208,435 B2 | 4/2007 | Hosaka et al. |
| 7,217,768 B2 | 5/2007 | Salek et al. |
| 7,445,827 B2 | 11/2008 | Le et al. |
| 8,445,598 B2 | 5/2013 | Nenseth et al. |
| 8,569,419 B2 * | 10/2013 | Massari ............. C08F 297/083 525/240 |
| 8,618,220 B2 | 12/2013 | Reijnjens et al. |
| 8,653,198 B2 | 2/2014 | Leland |
| 9,206,265 B2 | 12/2015 | Uozumi et al. |
| 9,416,238 B2 | 8/2016 | Leland |
| 10,113,014 B1 * | 10/2018 | Hosaka ................. C08F 210/06 |
| 2002/0058741 A1 | 5/2002 | Sakai et al. |
| 2014/0107274 A1 * | 4/2014 | Salek ..................... C08L 23/12 524/451 |
| 2015/0166693 A1 | 6/2015 | Hosaka et al. |
| 2015/0240011 A1 | 8/2015 | Hosaka et al. |

(Continued)

FOREIGN PATENT DOCUMENTS

| EP | 0602508 B | 11/1998 |
| EP | 0942021 A | 9/1999 |

(Continued)

OTHER PUBLICATIONS

Jiang, T., et al. "Copolymerization of Ethylene and Propylene Catalyzed by Magnesium Chloride Supported Vanadium/Titanium Bimetallic Ziegler-Natta Catalysts" Chinese Journal of Polymer Science, vol. 29, No. 4, pp. 475-482, 2011.

*Primary Examiner* — Rip A Lee
(74) *Attorney, Agent, or Firm* — Vorys, Sater, Seymour and Pease LLP

(57) ABSTRACT

Disclosed is a polypropylene with an MFR of at least 20 g/10 min comprising a homopolypropylene and within a range from 2 wt % to 20 wt % of a propylene-α-olefin copolymer by weight of the polypropylene, where the homopolypropylene has a MFR within a range from 30 g/10 min to 200 g/10 min, where the propylene-α-olefin copolymer comprises within a range from 30 wt % to 50 wt % α-olefin derived units by weight of the propylene-α-olefin copolymer, and has an IV within a range from 4 to 9 dL/g. The polypropylene may be obtained by combining a Ziegler-Natta catalyst having two transition metals with propylene in reactors in series to produce the homopolypropylene followed by a gas phase reactor to produce a propylene-α-olefin copolymer blended with the homopolypropylene.

14 Claims, No Drawings

(56) References Cited

U.S. PATENT DOCUMENTS

2016/0326355 A1* 11/2016 Marques Ferreira Custodio ........ C08L 23/12
2020/0140584 A1* 5/2020 Bauch .................. C08F 210/06

FOREIGN PATENT DOCUMENTS

| EP | 2738214 B | 5/2015 | |
|----|-----------|--------|---|
| EP | 2876118 A | 5/2015 | |
| EP | 3015504 A | 5/2016 | |
| WO | WO 2014/083130 A1 * | 6/2014 | ............. C08L 23/12 |
| WO | WO 2015/004251 A1 * | 1/2015 | ............. C08L 23/10 |

* cited by examiner

HIGH IMPACT POLYPROPYLENE IMPACT COPOLYMER

PRIORITY CLAIM

This application is a National Phase Application claiming priority to PCT Application Serial No. PCT/US2018/027090 filed Apr. 11, 2018, which claims priority to and the benefit of U.S. Provisional Application No. 62/525,354, filed Jun. 27, 2017, which are incorporated herein by reference.

FIELD OF THE INVENTION

The present disclosure relates to a blend of a homopolypropylene and propylene-α-olefin to form improved propylene-based impact copolymer's having a high melt flow rate (at least 20 g/10 min) and high impact strength.

BACKGROUND

Propylene-based impact copolymers ("ICP's"), sometimes called "block copolymers", are an intimate blend of a homopolypropylene and propylene-α-olefin (e.g., ethylene-propylene rubber "EPR"), and are useful in a number of commercial products such as automobile and appliance components. The homopolypropylene is said to form a continuous phase of the blend, while the propylene-α-olefin forms domains within the continuous phase, thus forming a heterogeneous blend. The catalysts often used to make ICP's comprise a solid catalyst components that includes magnesium, titanium, at least one internal electron donor, and at least one external electron donor as components, generally referred to as "Ziegler-Natta" catalysts. The properties of ICP's can be tailored at least in party by the identity of the solid catalyst and polymerization conditions. From its many components, there are a number of ways in which Ziegler-Natta catalysts can be varied to control the properties of the polymer produced therefrom.

For example, polypropylene stiffness (i.e., flexural modulus) is strongly correlated to its isotacticity. Generally, highly isotactic polypropylene shows high flexural modulus, and certain catalysts are known to effect this property. Also, adjustment of the amount and quality of the propylene-α-olefin may improve impact resistance of the ICP, which is also beneficial in certain applications.

Thus provided is an improved ICP and method to prepare a solid catalyst component for olefin polymerization that is suitable for producing ICP's. This sort of ICP would preferably show high flexural modulus due to high isotacticity and an orientation of high molecular weight fraction in the process of injection molding, but also good impact resistance as evidenced in its Izod Impact. The objects can be achieved by conducting the olefin homo- and co-polymerization using a catalyst that is obtained by combining two transition metals into one Ziegler-Natta catalyst that can be used to produce an ICP with high impact strength as well as high stiffness.

Related publications include U.S. Pat. Nos. 5,422,400; 6,054,542; 6,147,152; 6,403,708; 6,759,475; 7,081,493; 7,217,768; 7,445,827; 8,445,598; 8,618,220; 8,653,198; 9,416,238; EP 0602508 B1; EP 0 942 021 A1; EP 2 738 214 B1; US 2014/0107274; and US 2016/0326355.

SUMMARY

Disclosed is a polypropylene with a melt flow rate (MFR, ASTM D1238 230° C., 2.16 kg) of at least 20 g/10 min, or within a range from 20, or 40 g/10 min to 80, or 100, or 120 g/10 min comprising (or consisting of, or consisting essentially of) a homopolypropylene and within a range from 2, or 6, or 10 wt % to 14, or 16, or 20 wt % of a propylene-α-olefin copolymer by weight of the polypropylene (ICP); wherein the homopolypropylene has a MFR within a range from 30, or 50, or 70 g/10 min to 120, or 140, or 160, or 200 g/10 min; and the propylene-α-olefin copolymer comprises within a range from 30 wt % to 50 wt % α-olefin derived units by weight of the propylene-α-olefin copolymer, and an intrinsic viscosity ("IV") within a range from 4 to 9 dL/g.

In any embodiment the polypropylene is obtained by combining a Ziegler-Natta catalyst with propylene in two slurry reactors in series to produce the homopolypropylene, followed by combining the homopolypropylene and Ziegler-Natta catalyst with propylene and an α-olefin in a gas phase reactor to produce a propylene-α-olefin copolymer imbedded within the pores, and/or blended with the homopolypropylene.

Also in any embodiment the polypropylene is obtained by combining a Ziegler-Natta catalyst having at least two different Group 3 to Group 4 transition metal components.

DETAILED DESCRIPTION

Certain olefin polymerization catalysts do not contain an internal donor compound such as phthalate, which is known to function well for olefin polymerization. When such catalysts are used for propylene homopolymerization, the activity is low and isotacticity of obtained polypropylene is poor because the catalysts shown in the prior arts do not contain internal electron donor. Furthermore, propylene-based ICP's with a good balance between rigidity and impact resistance often cannot be produced because of the low productivity in making a highly-isotactic polypropylene. The inventors have found that ICP's with good rigidity and impact resistance can be achieved by effecting copolymerization using a copolymerization catalyst that includes a solid catalyst component that includes magnesium, titanium, vanadium, a halogen, and an organic acid diester compound as an internal electron donor.

Specifically, disclosed herein is a method for producing a homopolypropylene and an impact copolymer including the homopolypropylene using a Ziegler-Natta-type solid catalyst for olefin (co)polymerization. Preferably, a solid catalyst component for olefin polymerization comprising magnesium, a halogen, titanium, vanadium, and an internal electron donor compound selected by organic acid diester represented by the following general formula (1):

$$R^1_k(C_6H_{4-k})(COOR^2)(COOR^3), \qquad (1)$$

wherein $R^1$ is a halogen atom or an alkyl group having 1 to 20 carbon atoms, $R^2$ and $R^3$ are a linear alkyl group having 1 to 12 carbon atoms, a branched alkyl group having 3 to 6 carbon atoms, a vinyl group, or an alkenyl group, provided that $R^2$ and $R^3$ are either identical or different, and "k" is an integer from 0 to 4, provided that a plurality of $R^1$ are either identical or different when "k" is an integer from 2 to 4. When the solid catalyst component for olefin polymerization described herein is used to produce the copolymer component of the heterogeneous ICP, the isotacticity of the copolymer becomes high and the elasticity of the propylene-α-olefin copolymer part is increased, and the intrinsic viscosity of the propylene-α-olefin copolymer parts is high, and therefore the impact strength of the resulting copolymer is improved as compared with the case of using a known solid catalyst component.

The solid catalyst component for olefin polymerization can maintain high ethylene polymerization activity even at a polymerization temperature lower than the polymerization temperature employed when using a known solid catalyst component for olefin polymerization, and reduce the energy cost required for polymerization. This results in the inventive ICP's as described herein.

Solid Catalyst Component for Copolymerization that Forms Catalyst

A solid catalyst component for olefin polymerization (hereinafter may be referred to as "component (I)" or "solid catalyst component (I)") includes magnesium, a halogen, titanium, vanadium, and an internal electron donor compound selected by organic acid diester.

The internal electron donor compound is preferably one or more internal electron donor compound selected from the following general formula (1) (hereinafter may be referred to as "component (A)" or "compound (A)"):

$$R^1_k(C_6H_{4-k})(COOR^2)(COOR^3), \quad (1)$$

wherein $R^1$ is a halogen atom or an alkyl group having 1 to 20 carbon atoms, $R^2$ and $R^3$ are a linear alkyl group having 1 to 12 carbon atoms, a branched alkyl group having 3 to 12 carbon atoms, a vinyl group, or an alkenyl group having 3 to 12 carbon atoms, provided that $R^2$ and $R^3$ are either identical or different, and "k" is an integer from 0 to 4, provided that a plurality of $R^1$ are either identical or different when "k" is an integer from 2 to 4. Examples of the halogen in the general formula (1) include fluorine, chlorine, bromine, and iodine. Among these, chlorine, bromine, and iodine are preferable, and chlorine and iodine are particularly preferable.

Examples of the linear alkyl group having 1 to 20 carbon atoms that may be represented by $R^1$ in the general formula (1) is preferably a linear alkyl group having 1 to 12 carbon atoms, and more preferably a linear alkyl group having 1 to 10 carbon atoms. Examples $R^1$ include a methyl group, an ethyl group, a n-propyl group, a n-butyl group, a n-pentyl group, a n-hexyl group, a n-heptyl group, a n-octyl group, a n-nonyl group, a n-decyl group, and the like.

Examples of the branched alkyl group having 3 to 12 carbon atoms that may be represented by $R^2$ or $R^3$ in the general formula (1) is preferably a branched alkyl group having 3 to 10 carbon atoms, and more preferably a branched alkyl group having 4 to 8 carbon atoms. Examples of $R^2$ or $R^3$ include an alkyl group that includes a secondary carbon atom or a tertiary carbon atom (e.g., isopropyl group, isobutyl group, t-butyl group, isopentyl group, neopentyl group and 2-ethylhexyl). More particularly, examples of an alkenyl group having 3 to 12 carbon atoms that may be represented by $R^2$ or $R^3$ include an allyl group, a 3-butenyl group, a 4-hexenyl group, iso-butenyl group, a 5-hexenyl group, a 7-octenyl group, a 2-ethyl 4-hexenyl group, a 10-dodecenyl group, and the like. $R^2$ and $R^3$ are either identical or different, and "k" is an integer from 0 to 4, provided that a plurality of $R^1$ are either identical or different when "k" is an integer from 2 to 4. The value of "k" is 0 to 4, and preferably 0 to 2.

The solid catalyst component (I) may include a polysiloxane (hereinafter may be referred to as "component (F)"). The stereoregularity or the crystallinity of the resulting polymer can be improved, and production of a fine powder can be reduced by utilizing the polysiloxane. The term "polysiloxane" refers to a polymer that includes a siloxane linkage (—Si—O—) in the main chain, and is also referred to as "silicone oil". The polysiloxane may be a chain-like, partially hydrogenated, cyclic, or modified polysiloxane that is liquid or viscous at 23° C., and has a viscosity at 25° C. of 0.02 to 100 cm²/s (2 to 10,000 cSt), and preferably 0.03 to 5 cm²/s (3 to 500 cSt).

Examples of the chain-like polysiloxane include disiloxanes such as hexamethyldisiloxane, hexaethyldisiloxane, hexapropyldisiloxane, hexaphenyldisiloxane, 1,3-divinyltetramethyldisiloxane, 1,3-dichlorotetramethyldisiloxane, 1,3-dibromotetramethyldisiloxane, chloromethylpentamethyldisiloxane, 1,3-bis(chloromethyl)tetramethyldisiloxane, and for example, polysiloxane except disiloxanes such as dimethylpolysiloxane and methylphenylpolysiloxane. Examples of the partially hydrogenated polysiloxane include methyl hydrogen polysiloxane having a degree of hydrogenation of 10 to 80%. Examples of the cyclic polysiloxane include hexamethylcyclotrisiloxane, octamethylcyclotetrasiloxane, decamethylcyclopentasiloxane, 2,4,6-trimethylcyclotrisiloxane, and 2,4,6,8-tetramethylcyclotetrasiloxane. Examples of the modified polysiloxane include a higher fatty acid group-substituted dimethylsiloxane, an epoxy group-substituted dimethylsiloxane, and a polyoxyalkylene group-substituted dimethylsiloxane. Among these, decamethylcyclopentasiloxane and dimethylpolysiloxane are preferable, and decamethylcyclopentasiloxane is particularly preferable.

The content of titanium, vanadium, magnesium, halogen (halogen atoms), and the component (A) in the solid catalyst component (I) is not particularly limited. The content of titanium in the solid catalyst component (I) is preferably 0.1 to 10 wt %, more preferably 0.5 to 8.0 wt %, and most preferably 1.0 to 5.0 wt %. The content of vanadium in the solid catalyst component (I) is preferably 0.1 to 20 wt %, more preferably 0.1 to 10 wt %, and most preferably 0.2 to 8 wt %. The molar ratio of vanadium based on titanium (content of vanadium (mol)/content of titanium (mol)) in the solid catalyst component (I) is preferably 0.1 to 20, more preferably 0.2 to 16, and still more preferably 0.5 to 10. As used herein, "wt %" refers to the percent by weight of the named component as a percentage of all the components in, for example, the solid catalyst component.

The content of magnesium in the solid catalyst component (I) is preferably 10 to 40 wt %, more preferably 10 to 30 wt %, and most preferably 13 to 25 wt %. The content of the halogen (halogen atoms) in the solid catalyst component (I) is preferably 20 to 89 wt %, more preferably 30 to 85 wt %, and most preferably 40 to 75 wt %. The content of the internal electron donor in the solid catalyst component (I) is preferably 0.5 to 40 wt %, more preferably 1 to 30 wt %, and most preferably 2 to 25 wt %.

The solid catalyst component (I) may include a reagent that includes silicon, phosphorus, or a metal (e.g., aluminum) in addition to the above components. Examples of the reagent include an organosilicon compound that includes a Si—O—C linkage, an organosilicon compound that includes a Si—N—C linkage, a phosphoric acid compound that includes a P—O linkage, an organoaluminum compound (e.g., trialkylaluminum, dialkoxyaluminum chloride, alkoxyaluminum dihalide, and trialkoxyaluminum), and an aluminum trihalide. Among these, an organosilicon compound that includes a Si—O—C linkage, an organosilicon compound that includes a Si—N—C linkage, and an organoaluminum compound are preferable. When the solid catalyst component (I) includes such a reagent, the polymerization activity of the resulting solid catalyst component, and the stereoregularity of the resulting polymer can be improved. These reagents may be used either alone or in combination.

The solid catalyst component (I) that includes the reagent may further include an organosilicon compound represented by the following general formula (2) that includes an unsaturated alkyl group:

$$[CH_2=CH-(CH_2)_u]_t SiR^4_{4-t} \quad (2)$$

wherein $R^4$ is a hydrogen atom, an alkyl group having 1 to 20 carbon atoms, a cycloalkyl group, a phenyl group, a vinyl group, or a halogen atom, provided that a plurality of $R^4$ are either identical or different when a plurality of $R^4$ are present, "u" is an integer from 0 to 5, and "t" is an integer from 1 to 4. In this case, the polymerization activity of the resulting solid catalyst component, and the hydrogen response can be further improved. The term "unsaturated alkyl group" refers to a vinyl group or an alkenyl group.

Examples of the organosilicon compound include vinyl group-containing alkylsilanes, vinyl group-containing alkoxysilanes, vinyl group-containing cycloalkylsilanes, vinyl group-containing phenylsilanes, vinyl group-containing halogenated silanes, vinyl group-containing halogenated alkylsilanes, alkenyl group-containing vinylsilanes, alkenyl group-containing alkylsilanes, alkenyl group-containing alkoxysilanes, alkenyl group-containing cycloalkylsilanes, alkenyl group-containing phenylsilanes, alkenyl group-containing halogenated silanes, and alkenyl group-containing halogenated alkylsilanes. The vinyl group is represented by $CH_2=CH-$, and the alkenyl group is represented by $CH_2=CH-(CH_2)_u-$.

Among these, vinyltrialkylsilanes, allyltrialkylsilanes, divinyldialkylsilanes, diallyldialkylsilanes, trivinylalkylsilanes, and triallylalkylsilanes are preferable, and allyldimethylvinylsilane, diallyldimethylsilane, triallylmethylsilane, di-3-butenydimethylsilane, diallyldichlorosilane, and allyltriethylsilane are particularly preferable. These organosilicon compounds that include an unsaturated alkyl group may be used either alone or in combination.

Method for Producing Solid Catalyst Component (I) for Copolymerization

The solid catalyst component (I) is produced by bringing a vanadium compound into contact with a solid component that comprises magnesium, a halogen, titanium, and an internal electron donor compound.

The magnesium compound may be one or more compounds selected from a magnesium dihalide, a dialkylmagnesium, an alkylmagnesium halide, a dialkoxymagnesium, a diaryloxymagnesium, an alkoxymagnesium halide, a fatty acid magnesium salt, and the like. Among these, a magnesium dihalide, a mixture of a magnesium dihalide and a dialkoxymagnesium, and a dialkoxymagnesium are preferable, and a dialkoxymagnesium is particularly preferable.

Examples of the dialkoxymagnesium include dimethoxymagnesium, diethoxymagnesium, dipropoxymagnesium, dibutoxymagnesium, ethoxymethoxymagnesium, ethoxypropoxymagnesium, butoxyethoxymagnesium, and the like. These dialkoxymagnesiums may be produced by reacting magnesium metal with an alcohol in the presence of a halogen, a halogen-containing metal compound, or the like. These dialkoxymagnesiums may be used either alone or in combination.

It is preferable to use a granular or powdery dialkoxymagnesium when producing the solid catalyst component used. The dialkoxymagnesium may have an indefinite shape or a spherical shape. For example, when using a spherical dialkoxymagnesium, a polymer powder obtained by polymerization has a better particle shape and a narrow particle size distribution. This improves the handling capability of the polymer powder during polymerization, and eliminates problems such as clogging caused by a fine powder included in the polymer powder.

The spherical dialkoxymagnesium need not necessarily have a perfect spherical shape, but may have an elliptical shape or a potato-like shape. The "sphericity" ratio (1/w) of the major axis diameter l to the minor axis diameter "w" of the spherical dialkoxymagnesium is 3, or 2, or 1.5, or 1.3, or 1.25, or 1.2 or less, preferably 1 to 2, and more preferably 1 to 1.5.

The average particle size $D_{50}$ (i.e., the particle size at 50% in the cumulative volume particle size distribution) of the dialkoxymagnesium measured using a laser diffraction/scattering particle size distribution analyzer is preferably within a range from 1, or 5, or 10, or 20 μm to 40, or 50, or 60, or 80, or 100, or 120, or 150, or 200 μm. It is preferable that the spherical dialkoxymagnesium have a narrow particle size distribution, and have a low fine powder content and a low coarse powder content. More specifically, it is preferable that the spherical dialkoxymagnesium have a content of particles having a particle size (measured using a laser diffraction/scattering particle size distribution analyzer) equal to or less than 5 μm of 20% or less, and more preferably 10% or less. It is preferable that the spherical dialkoxymagnesium have a content of particles having a particle size equal to or more than 100 μm of 10% or less, and more preferably 5% or less.

The particle size distribution $\ln(D_{90}/D_{10})$ (where, $D_{90}$ is the particle size at 90% in the cumulative volume particle size distribution, and $D_{10}$ is the particle size at 10% in the cumulative volume particle size distribution) of the spherical dialkoxymagnesium is preferably 3 or less, and more preferably 2 or less. The spherical dialkoxymagnesium may be produced using the method disclosed in JP-A-58-41832, JP-A-62-51633, JP-A-3-74341, JP-A-4-368391, JP-A-8-73388, or the like.

The magnesium compound may be used in the form of a magnesium compound solution, or may be used in the form of a magnesium compound suspension. When the magnesium compound is solid, magnesium compound is dissolved in a solvent that can dissolve the magnesium compound to prepare a magnesium compound solution, or suspended in a solvent that cannot dissolve the magnesium compound to prepare a magnesium compound suspension. When the magnesium compound is liquid, the magnesium compound may be used directly as a magnesium compound solution, or may be dissolved in a solvent that can dissolve the magnesium compound to prepare a magnesium compound solution.

Examples of a compound that can dissolve the solid magnesium compound include at least one compound selected from the group consisting of an alcohol, an ether, and an ester. Specific examples of the compound that can dissolve the solid magnesium compound include an alcohol having 1 to 18 carbon atoms, such as methanol, ethanol, propanol, butanol, pentanol, hexanol, 2-ethylhexanol, octanol, dodecanol, octadecyl alcohol, oleyl alcohol, benzyl alcohol, phenylethyl alcohol, cumyl alcohol, isopropyl alcohol, isopropylbenzyl alcohol, and ethylene glycol, a halogen-containing alcohol having 1 to 18 carbon atoms, such as trichloromethanol, trichloroethanol, and trichlorohexanol, an ether having 2 to 20 carbon atoms, such as methyl ether, ethyl ether, isopropyl ether, butyl ether, amyl ether, tetrahydrofuran, ethyl benzyl ether, dibutyl ether, anisole, and diphenyl ether, a metal acid ester such as tetraethoxytitanium, tetra-n-propoxytitanium, tetraisopropoxytitanium, tetrabutoxytitanium, tetrahexoxytitanium, tetrabutoxyzirconium, and tetraethoxyzirconium, and the like. Among these, an alcohol (e.g., ethanol, propanol, butanol, and 2-ethylhexanol) is preferable, and 2-ethylhexanol is particularly preferable.

A saturated hydrocarbon solvent or an unsaturated hydrocarbon solvent that does not dissolve a magnesium compound is used as a medium. Examples of the saturated hydrocarbon solvent or the unsaturated hydrocarbon solvent include a linear or branched aliphatic hydrocarbon compound having a boiling point of 50 to 200° C., such as hexane, heptane, decane, and methylheptane, an alicyclic hydrocarbon compound having a boiling point of 50 to 200° C., such as cyclohexane, ethylcyclohexane, and decahydronaphthalene, and an aromatic hydrocarbon compound having a boiling point of 50 to 200° C., such as toluene, xylene, and ethylbenzene. Among these, a linear aliphatic hydrocarbon compound having a boiling point of 50 to 200° C. (e.g., hexane, heptane, and decane), and an aromatic hydrocarbon compound having a boiling point of 50 to 200° C. (e.g., toluene, xylene, and ethylbenzene) are preferable. These solvents may be used either individually or in combination.

Examples of the titanium compound include a tetravalent titanium compound represented by the following general formula (3):

$$\text{Ti}(OR^5)_j X_{4-j} \quad (3)$$

wherein $R^5$ is a hydrocarbon group having 1 to 10 carbon atoms, provided that a plurality of $R^5$ are either identical or different when a plurality of $OR^5$ are present, "X" is a halogen group, provided that a plurality of X are either identical or different when a plurality of "X" are present, and "j" is an integer from 0 to 4.

The tetravalent titanium compound represented by the general formula (3) is one compound, or two or more compounds, selected from an alkoxytitanium, a titanium halide, and an alkoxytitanium halide. Specific examples of the tetravalent titanium compound include titanium tetrahalides such as titanium tetrafluoride, titanium tetrachloride, titanium tetrabromide, and titanium tetraiodide, alkoxytitanium trihalides such as methoxytitanium trichloride, ethoxytitanium trichloride, propoxytitanium trichloride, and n-butoxytitanium trichloride, dialkoxytitanium dihalides such as dimethoxytitanium dichloride, diethoxytitanium dichloride, dipropoxytitanium dichloride, and di-n-butoxytitanium dichloride, and trialkoxytitanium halides such as trimethoxytitanium chloride, triethoxytitanium chloride, tripropoxytitanium chloride, and tri-n-butoxytitanium chloride. Among these, halogen-containing titanium compounds are preferable, titanium tetrahalides such as titanium tetrachloride, titanium tetrabromide, and titanium tetraiodide are more preferable, and titanium tetrachloride is particularly preferable. These titanium compounds may be used either alone or in a combination. The tetravalent titanium compound represented by the general formula (3) may be used in a state in which the tetravalent titanium compound is diluted with a hydrocarbon compound, a halogenated hydrocarbon compound, or the like.

A halogen compound other than the titanium compound may optionally be used to produce the solid catalyst component (I). Examples of the halogen compound include a tetravalent halogen-containing silicon compound. Specific examples of the halogen compound include a silane tetrahalide such as tetrachlorosilane (silicon tetrachloride) and tetrabromosilane, and an alkoxy group-containing halogenated silane such as methoxytrichlorosilane, ethoxytrichlorosilane, propoxytrichlorosilane, n-butoxytrichlorosilane, dimethoxydichlorosilane, diethoxydichlorosilane, dipropoxydichlorosilane, di-n-butoxydichlorosilane, trimethoxychlorosilane, triethoxychlorosilane, tripropoxychlorosilane, and tri-n-butoxychlorosilane.

In the process for producing the solid catalyst component for olefin polymerization, the vanadium compound is not particularly limited. The above vanadium compound is, for example, one or more vanadium compound selected from $VBr_2$, $VBr_3$, $VBr_4$, $VC$, $VCl_2$, $VCl_3$, $VCl_4$, $VCl_5$, $VF_2$, $VF_3$, $VF_4$, $VF_5$, $VI_2$, $VI_3$, $VO$, $VO_2$, $V_2O_3$, $V_2O_5$, $VBrO$, $VBr_2O$, $VBr_3O$, $V(C_5H_5)_2$, $VClO$, $VClO_2$, $VCl_2O$, $VCl_3O$, $V(CO)_6$, $VFO$, $VF_2O$, $VF_3O$, $VI_2O$, $V(OH)_3$, $VSO_4$, $V_2(SO_4)_3$, $V(C_5H_5)Cl_3$, $V(C_5H_5)_2Cl_2$, $V(CH_3COO)_2$, $V(CH_3COO)_3$, $VO(OCH_3)Cl_2$, $VO(OC_2H_5)Cl_2$, $VO(OC_2H_5)_{1.5}Cl_{1.5}$, $VO(OCH_3)_2Cl$, $VO(OC_2H_5)_3$, $V(C_5H_5)_2Cl_2$, $V(C_{10}H_{10})_2Cl_2$, $V(CH_3COCH_2COCH_3)_3$, $V((CH_3CHCH_3COCH_3)_3$, and preferably one or more vanadium compound selected from $VCl_3O$, $VCl_3$, $VCl_4$, $V(C_5H_5)_2Cl_2$, $V(CH_3COCH_2COCH_3)_3$.

The internal electron donor compound used to produce the solid catalyst component (I) is preferably the component (A) included in the solid catalyst component (I).

A polysiloxane that is optionally used to produce the solid catalyst component (I) is the same as the polysiloxane that is optionally included in the solid catalyst component (I), and description thereof is omitted.

In particular, exemplary methods for preparing the solid catalyst component (I) can be summarized as follows:
1. A solid component obtained by co-grinding at least one magnesium compound selected from the group comprising alkyl magnesium halide, dihalogenated magnesium, and dialkoxymagnesium, an electron donor compound and a vanadium compound and a titanium compound is suspended in a solvent, then is heat treated together with the solvent.
2. A solid component obtained by the reaction of at least one magnesium compound selected from the group comprising alkyl magnesium halide, dihalogenated magnesium, and dialkoxymagnesium and an electron donor compound is suspended in a solvent, then is heat treated together with the solvent in the coexistence of a vanadium compound and a titanium compound.
3. In the process of contacting at least one magnesium compound selected from the group comprising alkyl magnesium halide, dihalogenated magnesium, and dialkoxymagnesium and an electron donor compound with a halogenated titanium, they are heat treated together with a solvent in the coexistence of a vanadium compound.
4. When the reaction of a solid catalyst component treated with a magnesium compound, a titanium compound and an electron donor with a tetravalent titanium halide is repeated two or more times, a vanadium compound is added in each process or in any process.
5. When the reaction of a solid catalyst component treated with a magnesium compound, a titanium compound and an electron donor with a tetravalent titanium halide and an electron donor compound is repeated two or more times, a vanadium compound is added.
6. When the reaction of a solid catalyst component treated with a magnesium compound, a titanium compound and an electron donor with an electron donor compound is repeated two or more times, a vanadium compound is added.

7. When a solid catalyst component treated with a magnesium compound, a titanium compound and an electron donor is washed with a solvent, a vanadium compound is added.
8. A vanadium compound is added to a solid catalyst component obtained by treating with a magnesium compound, a titanium compound and an electron donor.

The added amount of the above vanadium compound is preferably 0.01 to 10 mol, more preferably 0.05 to 5 mol, and further preferably 0.1 to 3 mol, in terms of vanadium atom, based on 1 mol of Ti atom included in the Ti compound used.

It is also preferable to bring the solid catalyst component (I) obtained by the above method into contact with the organosilicon compound that includes a Si—O—C linkage, the organosilicon compound that includes a Si—N—C linkage, the organoaluminum compound (optional), and the organosilicon compound represented by the general formula (2) (optional), from in order to improve the polymerization activity of the solid catalyst component, and improving the hydrogen response. The solid catalyst component (I) is brought into contact with these compounds in the presence of a hydrocarbon solvent. After bringing the solid catalyst component (I) into contact with each component, the mixture is sufficiently washed with a hydrocarbon solvent to remove unnecessary components. The solid catalyst component (I) may be repeatedly brought into contact with each compound.

The components are brought into contact with each other at −10 to 100° C., preferably 0 to 90° C., and particularly preferably 20 to 80° C. The contact time is 1 minute to 10 hours, preferably 10 minutes to 5 hours, and particularly preferably 30 minutes to 2 hours. The organosilicon compound that includes a Si—O—C linkage, the organosilicon compound that includes a Si—N—C linkage, and the organosilicon compound represented by the general formula (2) are normally used in an amount of 0.2 to 20 mol, preferably 0.5 to 10 mol, and particularly preferably 1 to 5 mol, per mol of the titanium atoms included in the solid catalyst component (I). The organoaluminum compound is normally used in an amount of 0.5 to 50 mol, preferably 1 to 20 mol, and particularly preferably 1.5 to 10 mol, per mol of the titanium atoms included in the solid catalyst component (I).

It is preferable to remove the solvent from the resulting solid catalyst component (I) so that the weight ratio of the solvent relative to the solid component is ⅓ or less, and preferably ⅙ to 1/20, to obtain a powdery solid component.

The ratio of the components used when producing the solid catalyst component (I) is determined taking account of the production method. For example, the tetravalent titanium halide compound is used in an amount of 0.5 to 100 mol, preferably 0.5 to 50 mol, and more preferably 10 mol, based on 1 mol of the magnesium compound. The polysiloxane is used in an amount of 0.01 to 100 g, preferably 0.05 to 80 g, and still more preferably 1 to 50 g, based on 1 mol of the magnesium compound.

Olefin Polymerization Catalyst

An olefin polymerization catalyst comprising the above mentioned solid catalyst component for olefin polymerization, an organoaluminum promoter, and an optional external electron donor. Note that an optional external electron donor may not be used when the solid catalyst component (I) includes the organosilicon compound that includes a Si—O—C linkage, the organosilicon compound that includes a Si—N—C linkage, or the organoaluminum compound (reagent), or when the solid catalyst component that includes the reagent further includes the organosilicon compound represented by the general formula (2). Specifically, the catalyst that includes the solid catalyst component and the organoaluminum compound exhibits excellent polymerization activity, and ensures excellent hydrogen response, even when an optional external electron donor is not used.

Specific examples of the organoaluminum compound include trialkylaluminums such as triethylaluminum, triisopropylaluminum, tri-n-butylaluminum, tri-n-hexylaluminum, and triisobutylaluminum, alkylaluminum halides such as diethylaluminum chloride and diethylaluminum bromide, diethylaluminum hydride, and the like. Among these, alkyaluminum halides such as diethylaluminum chloride, and trialkylaluminums such as triethylaluminum, tri-n-butylaluminum, and triisobutylaluminum are preferable, and triethylaluminum and triisobutylaluminum are particularly preferable. These organoaluminum compounds may be used either alone or in combination.

Examples of the external electron donor compound used to produce the polymerization catalyst described herein include an organic compound that includes an oxygen atom or a nitrogen atom. Examples of the organic compound that includes an oxygen atom or a nitrogen atom include an alcohol, a phenol, an ether, an ester, a ketone, an acid halide, an aldehyde, an amine, an amide, a nitrile, an isocyanate, and an organosilicon compound. The external electron donor compound may be an organosilicon compound that includes a Si—O—C linkage, an aminosilane compound that includes a Si—N—C linkage, or the like.

Among these, an ester such as ethyl benzoate, ethyl p-methoxybenzoate, ethyl p-ethoxybenzoate, methyl p-toluate, ethyl p-toluate, methyl anisate, and ethyl anisate, a 1,3-diether, an organosilicon compound that includes a Si—O—C linkage, and an aminosilane compound that includes a Si—N—C linkage are preferable, and an organosilicon compound that includes a Si—O—C linkage, an aminosilane compound that includes a Si—N—C linkage, and a 2-substituted 1,3-diether are particularly preferable.

Examples of the organosilicon compound that includes a Si—O—C linkage that may be used as the external electron donor compound (III) include an organosilicon compound represented by the following general formula (4):

wherein $R^6$ is an alkyl group having 1 to 12 carbon atoms, a vinyl group, an alkenyl group having 3 to 12 carbon atoms, a cycloalkyl group having 3 to 12 carbon atoms, a cycloalkenyl group having 3 to 12 carbon atoms, an aromatic hydrocarbon group having 6 to 15 carbon atoms, or a substituted aromatic hydrocarbon group, provided that a plurality of $R^6$ are either identical or different when a plurality of $R^6$ are present, $R^7$ is an alkyl group having 1 to 4 carbon atoms, a vinyl group, an alkenyl group having 3 to 12 carbon atoms, a cycloalkyl group having 3 to 6 carbon atoms, an aromatic hydrocarbon group having 6 to 12 carbon atoms, or a substituted aromatic hydrocarbon group having 7 to 12 carbon atoms, provided that a plurality of $R^7$ are either identical or different when a plurality of $R^7$ are present, and "q" is an integer from 0 to 3.

Examples of the aminosilane compound that includes a Si—N—C linkage that may be used as the external electron donor compound (III) include an aminosilane compound represented by the following general formula (5):

wherein $R^8$ and $R^9$ are a hydrogen atom, an alkyl group having 1 to 20 carbon atoms, a vinyl group, an alkenyl group having 3 to 20 carbon atoms, a cycloalkyl group having 3 to 20 carbon atoms, a cycloalkenyl group having 3 to 20 carbon atoms, or an aryl group having 6 to 20 carbon atoms, provided that $R^8$ and $R^9$ are either identical or different, and optionally bond to each other to form a ring, $R^{10}$ is an alkyl group having 1 to 20 carbon atoms, a vinyl group, an alkenyl group having 3 to 12 carbon atoms, an alkoxy group having 1 to 20 carbon atoms, a vinyloxy group, an alkenyloxy group having 3 to 20 carbon atoms, a cycloalkyl group having 3 to 20 carbon atoms, a cycloalkyloxy group having 3 to 20 carbon atoms, an aryl group having 6 to 20 carbon atoms, or an aryloxy group having 6 to 20 carbon atoms, provided that a plurality of $R^8$ are either identical or different when a plurality of $R^8$ are present, and "s" is an integer from 1 to 3.

Examples of the organosilicon compound represented by the general formula (4) or (5) include phenylalkoxysilanes, alkylalkoxysilanes, phenylalkylalkoxysilanes, cycloalkylalkoxysilanes, alkyl(cycloalkyl)alkoxysilanes, (alkylamino)alkoxysilanes, alkyl(alkyl amino)alkoxysilanes, cycloalkyl(alkyl amino)alkoxysilanes, tetraalkoxysilanes, tetrakis(alkyl amino)silanes, alkyltris(alkylamino)silanes, dialkylbis(alkylamino)silanes, trialkyl(alkylamino)silanes, and the like. Specific examples of the organosilicon compound represented by the general formula (4) or (5) include n-propyltriethoxysilane, cyclopentyltriethoxysilane, phenyltrimethoxysilane, phenyltriethoxysilane, t-butyltrimethoxysilane, diisopropyldimethoxysilane, isopropylisobutyldimethoxysilane, diisopentyldimethoxysilane, bis(2-ethylhexyl)dimethoxysilane, t-butylmethyldimethoxysilane, t-butylethyldimethoxysilane, dicyclopentyldimethoxysilane, dicyclohexyldimethoxysilane, cyclohexylcyclopentyldimethoxysilane, cyclohexylmethyldimethoxysilane, tetraethoxysilane, tetrabutoxysilane, bis(ethyl amino)methylethylsilane, bis(ethylamino)-t-butylmethylsilane, bis(ethylamino)dicyclohexylsilane, dicyclopentylbis(ethylamino)silane, bis(methylamino)(methylcyclopentylamino)methylsilane, diethylaminotriethoxysilane, bis(cyclohexylamino)dimethoxysilane, bis(perhydroisoquinolino)dimethoxysilane, bis(perhydroquinolino)dimethoxysilane, ethyl(isoquinolino)dimethoxysilane, and the like. The external electron donor compound (III) may be one or more compounds selected from n-propyltriethoxysilane, phenyltrimethoxysilane, t-butylmethyldimethoxysilane, t-butylethyldimethoxysilane, diisopropyldimethoxysilane, isopropylisobutyldimethoxysilane, diisopentyldimethoxysilane, diphenyldimethoxysilane, dicyclopentyldimethoxysilane, cyclohexylmethyldimethoxysilane, tetramethoxysilane, tetraethoxysilane, t-butylmethylbis(ethylamino)silane, bis(ethyl amino)dicyclohexylsilane, dicyclopentylbis(ethylamino)silane, bis(perhydroisoquinolino)dimethoxysilane, diethylaminotriethoxysilane, and the like.

Method for Copolymerizing Propylene and α-Olefin

In any embodiment, propylene and an α-olefin are copolymerized in the presence of the copolymerization catalyst to produce a propylene-based ICP. The α-olefin may be at least one olefin selected from an α-olefin having 2 to 20 carbon atoms (excluding propylene having 3 carbon atoms). Examples of the α-olefin include ethylene, 1-butene, 1-pentene, 4-methyl-1-pentene, vinylcyclohexane, and the like. These α-olefins may be used either alone or in combination. Among these, ethylene and 1-butene are preferable, and ethylene is particularly preferable.

Examples of the copolymerization method used in connection with any embodiment include a slurry polymerization method that utilizes an inert hydrocarbon solvent such as cyclohexane or heptane, a bulk polymerization method that utilizes a solvent such as liquefied propylene, and a vapor-phase polymerization method that substantially does not utilize a solvent. An ICP can be obtained by repeatedly implementing such a polymerization method in a plurality of steps. A combination of the bulk polymerization method and the vapor-phase polymerization method, or a multistep vapor-phase polymerization method is preferable as the copolymerization method.

It is preferable to homopolymerize propylene, or copolymerize propylene and a small amount of α-olefin (particularly ethylene) in the first step, and copolymerize propylene and an α-olefin (particularly ethylene), or copolymerize propylene, ethylene, and 1-butene in the second step. Note that the first step and the second step may respectively be performed a plurality of times.

It is preferable to effect polymerization in the first step while adjusting the polymerization temperature and the polymerization time so that the ICP comprises 98 to 60 wt % of the homopolypropylene. As used herein, "homopolypropylene" refers to a polymer comprising propylene-derived units and less than 0.5, or 0.4, or 0.3, or 0.2 wt % ethylene or other non-C3 α-olefin units by weight of the homopolypropylene. As used herein, "propylene-α-olefin copolymer" refers to a polymer comprising propylene-derived units and comprises within a range from 30 wt % to 50 wt % α-olefin derived units by weight of the propylene-α-olefin copolymer, preferably randomly. It is preferable to introduce propylene and ethylene or another α-olefin in the second step, and polymerize the components so that the ratio of the propylene-α-olefin copolymer part such as an ethylene-propylene rubber or an ethylene-propylene-1-butene ternary copolymer is 2 to 40 wt % of the ICP.

The polymerization temperature in the first step and the second step is 200° C. or less, and preferably 100° C. or less. The polymerization pressure in the first step and the second step is 10 MPa or less, and preferably 5 MPa or less. The polymerization time in each step (the residence time when implementing continuous polymerization) is normally 1 minute to 5 hours. The copolymerization method described herein may be implemented using a continuous polymerization method or a batch polymerization method. Each of the first-step polymerization reaction and the second-step polymerization reaction may be implemented in a single step or a plurality of steps. When the first-step polymerization reaction or the second-step polymerization reaction is implemented in a plurality of steps, each step may be implemented under identical conditions or different conditions. It is preferable that the second-step polymerization reaction be a vapor-phase polymerization reaction since elution of EPR from polypropylene particles can be suppressed.

The catalyst components may be used for copolymerization in an arbitrary ratio to obtain the ICP as described herein. The organoaluminum compound is normally used in an amount of 1 to 2000 mol, and preferably 50 to 1000 mol, per mol of the titanium atoms included in the solid catalyst component (I). The external electron donor compound is normally used in an amount of 0.002 to 10 mol, preferably 0.01 to 2 mol, and particularly preferably 0.01 to 0.5 mol, per mol of the organoaluminum component. The components may be brought into contact with each other in an arbitrary order. It is desirable to add the organoaluminum compound to the polymerization system, and bring the component (I) into contact with the organoaluminum compound.

When copolymerizing an olefin using the catalyst that includes the solid catalyst component, the organoaluminum compound, and the external electron donor compound (hereinafter may be referred to as "main polymerization"), it is desirable to effect preliminary polymerization prior to the main polymerization in order to further improve the catalytic activity, the stereoregularity, the particle properties of the resulting polymer, and the like. An olefin that is subjected to the main polymerization, or a monomer such as styrene, may be used for the preliminary polymerization.

The components and the monomer may be brought into contact with each other in an arbitrary order when effecting the preliminary polymerization. Note that it is preferable to add the organoaluminum component to the preliminary polymerization system containing an inert gas atmosphere or an olefin gas atmosphere, bring the solid catalyst component (I) into contact with the organoaluminum component, and then bring the olefin (e.g., propylene), or a mixture of propylene and one or more additional olefins, into contact with the above mixture.

When effecting the preliminary polymerization using the component, it is desirable to add the organoaluminum component to the preliminary polymerization system containing an inert gas atmosphere or an olefin gas atmosphere, bring the external electron donor component into contact with the organoaluminum component, bring the solid catalyst component (I) into contact with the mixture, and then bring the olefin (e.g., propylene), or a mixture of propylene and one or more additional olefins, into contact with the above mixture.

A large amount of comonomer can be incorporated into the propylene-α-olefin copolymer under identical conditions by utilizing the production method described herein that utilizes the above catalyst, and the resulting ICP can be applied to a wide range of products. It is also possible to achieve high sustainability of polymerization of the propylene-α-olefin copolymer part, and control the properties of the propylene-α-olefin copolymer part through multistep polymerization.

In commercial operations the ICP's described herein are preferably produced in series reactors wherein the polypropylene homopolymer is first produced in one or more slurry reactors, preferably in series, by contacting a catalyst and monomers, preferably propylene, such as in slurry-loop reactors well known in the art, followed by combining the same catalyst and formed homopolymer in a single gas-phase reactor with monomers, preferably propylene and ethylene and/or C4 to C10 α-olefins, to produce the propylene copolymer such that the copolymer imbeds itself in the homopolymer as discrete domains with the homopolymer as a matrix or "continuous" phase. The melt flow rate of the individual components can be controlled by, for example, addition and removal of hydrogen from the reactors. Most preferably, the homopolymer is produced in two loop-slurry reactors in series and each as a similar or same amount of hydrogen, producing homopolymer of nearly the same or the same MFR. The amount of hydrogen in the gas phase reactor may be the same or different from the loop slurry reactor, such level controlled by removing the hydrogen from the homopolymer stream entering the gas phase reactor or at some other stage. A suitable process and apparatus is described in the relevant portions of U.S. Pat. Nos. 9,000,106 and 8,076,419. The systems and processes disclosed therein can be used in a "balanced" reactor scheme where two or more slurry loop reactors in series forming the polypropylene homopolymer are under the same or similar conditions, followed by transfer of the crystalline polymer (polypropylene homopolymer) to a single gas phase reactor to form the semi-crystalline polymer (propylene copolymer).

Copolymer of Propylene and α-Olefin

An ICP is normally a polymer in which two or more polymer chains that differ in polymer primary structure (e.g., type of monomer, type of comonomer, comonomer composition, comonomer content, comonomer sequence, and stereoregularity) are linked within one molecular chain. A propylene-based ICP obtained using the method described herein is characterized in that polymers that differ in monomer composition are produced by multistep polymerization. Specifically, the main part of the propylene-based ICP has a structure in which two or more polymers that differ in monomer composition are present in each polymer particle in a mixed state (some of the polymers are linked through the polymer chain).

The propylene-based ICP obtained using the method described herein exhibits moderate rigidity due to the presence of crystalline polypropylene, or a crystalline propylene-α-olefin copolymer that includes crystalline polypropylene and a small amount of α-olefin, and exhibits excellent impact resistance due to the presence of the propylene-α-olefin obtained by second-step polymerization. The balance between rigidity and impact resistance varies depending on the ratio of homopolypropylene and the propylene-α-olefin copolymer part. The propylene-based ICP includes the propylene-α-olefin copolymer part in a high ratio since the polymerization activity (impact ratio) of the propylene-α-olefin copolymer part obtained by second-step polymerization is high. Since a large amount of α-olefin (e.g., ethylene) is introduced into the propylene-α-olefin, the copolymer exhibits relatively high rigidity with respect to the amount of propylene-α-olefin copolymer part and the ethylene content in the crystalline part. The copolymer exhibits high impact strength with respect to a polymer that includes an identical propylene-α-olefin copolymer part.

More particularly, the ICP obtained can be described as a polypropylene with a melt flow rate (ASTM D1238 230° C., 2.16 kg) of at least 20 g/10 min, or within a range from 20, or 40 g/10 min to 80, or 100, or 120 g/10 min comprising (or consisting of, or consisting essentially of) a homopolypropylene and within a range from 2, or 6, or 10 wt % to 14, or 16, or 20, or 40 wt % of a propylene-α-olefin copolymer based on the weight of the ICP; wherein the homopolypropylene has a MFR within a range from 30, or 50, or 70 g/10 min to 120, or 140, or 160, or 200 g/10 min, and 1.1, or 1.0, or 0.9 wt % or less atactic polypropylene based on the total weight of the homopolypropylene and atactic polypropylene; and the propylene-α-olefin copolymer comprises within a range from 30 wt % to 50 wt % α-olefin derived units by weight of the propylene-α-olefin copolymer, and an intrinsic viscosity within a range from 4 to 7, or 8, or 9 dL/g.

In any embodiment, the ICP's described herein comprise (or consist of, or consist essentially of) within the range from 2, or 6, or 8, or 10, or 12 wt % to 16, or 18, or 20, or 40 wt % of the propylene-α-olefin copolymer portion by weight of the ICP, most preferably an ethylene-propylene rubber, wherein the remainder is the homopolypropylene portion.

The propylene propylene-α-olefin copolymer portion of the ICP's described herein have certain desirable features. In any embodiment, the xylene-insoluble portion of the propylene-α-olefin copolymer, such as crystalline portion or the copolymer domains, has an ethylene content of 3.0, or 2.4, or 2.2, or 2, or 1.8, or 1.5, or 1.4 wt % or less relative to the total amount monomer units, or within a range from 2.5 wt % to 3.0, or 3.5, or 4.0, or 4.5 wt %. In any embodiment, the α-olefin derived units are selected from the group consisting of ethylene, and C4 to C8 α-olefin derived units, and combinations thereof, most preferably ethylene.

The homopolypropylene portion of the inventive ICP's have certain desirable properties. In any embodiment, the homopolypropylene portion of the ICP has a weight average molecular weight (Mw) within a range from 150,000 g/mole to 400,000 g/mole. In any embodiment, the homopolypropylene portion of the ICP has a z-average molecular weight (Mz) of at least 1,100, or 1,400, or 1,600, or 2,000 kg/mole, and preferably up to 3,000, or 3,500, or 4,000, or 4,500 kg/mole. In any embodiment, the homopolypropylene portion of the ICP has an Mz/Mn value within a range from 70, or 80, or 100 to 140, or 160. In any embodiment the homopolypropylene comprises two homopolypropylene components having different MFR's. In any embodiment, the homopolypropylene portion of the ICP has a flexural modulus of at least 1800, or 1900 MPa, or a flexural modulus within a range from 1800, or 1900 MPa to 2200, or 2400, or 2600, or 2800 MPa.

In any embodiment the ICP's have a flexural modulus of at least 1400, or 1450, or 1500 MPa, or within a range from 1400, or 1450, or 1500 MPa to 1700, or 1800, or 1900, or 2000, or 2200 MPa. In any embodiment the ICP's have an Izod impact (−30° C.) of at least 3, or 3.2, or 3.6 kJ/m$^2$, and preferably up to 5, or 6 kJ/m$^2$.

In any embodiment, the ICP's can be described as being obtained by combining a Ziegler-Natta catalyst described herein, preferably using catalyst component (I), with propylene in two slurry reactors in series to produce the homopolypropylene, followed by combining the homopolypropylene and Ziegler-Natta catalyst with propylene and an α-olefin in a gas phase reactor to produce a propylene-α-olefin copolymer blended with the homopolypropylene. Most desirably the ICP's described herein are obtained by combining a Ziegler-Natta catalyst having at least two different Group 3 to Group 4 transition metal components. In any embodiment, the Ziegler-Natta catalyst comprises an dialkyl- and/or dialkoxymagnesium support having an average particle size within a range from 5, or 10, or 20 μm to 60, or 80, or 100, or 120 μm, and a sphericity of 3, or 1.5, or 1.3, or 1.25, or 1.2 or less.

The ICP's described herein have a number of uses such as automotive components or appliance components. For instance the inventive ICP's are useful in washing machine components, refrigerator components, electronic articles (e.g., stereos, radios, lap-top computers, desk-top computers, hand-held devices, etc.), mixing devices, and other tools and domestic wear. More particular uses of the ICP include washing machine lids, control panel, vacuum cleaner components, water dispenser panels, window air conditioning casing, and refrigerator door buckets and bins. The inventive ICP's are also suitable for applications such as interior trim automotive components in the neat form or as a compounding base to make thermoplastic olefin formulations used in the automotive industry such as instrument panel, bumper fascia, glove box bins, etc.

Such ICP's may also be combined with colorants, fillers and/or other polymers such as propylene-based elastomers, other impact copolymers, or ethylene-based plastomers, any of which may individually be present from 5 wt % to 20, or 30 wt %, by weight of all the components. Most preferably the ICP is blended only with colorants, antioxidants, and other minor additives to less than 4, or 2 wt % by weight of the components The various descriptive elements and numerical ranges disclosed herein for the inventive polypropylene compositions and process to obtain them can be combined with other descriptive elements and numerical ranges to describe the invention(s); further, for a given element, any upper numerical limit can be combined with any lower numerical limit described herein, including the examples in jurisdictions that allow such combinations.

EXAMPLES

The invention is further described below by way of examples. Note that the following examples are for illustration purposes only, and the homopolypropylene and ICP is not limited to the following examples. In the examples and comparative examples the content of magnesium atoms, titanium atoms, halogen atoms, and the internal electron donor compound in the solid catalyst component were measured as described below. In the following examples, an ethylene-propylene random copolymer is the propylene-α-olefin.

Content of Magnesium Atoms in Solid Catalyst Component

The solid catalyst component from which the solvent component had been completely removed by heating (drying) under reduced pressure was weighed, and dissolved in a hydrochloric acid solution. After the addition of methyl orange (indicator) and a saturated ammonium chloride solution, the mixture was neutralized with aqueous ammonia, heated, cooled, and filtered to remove a precipitate (titanium hydroxide). A given amount of the filtrate was isolated preparatively, and heated. After the addition of a buffer and an EBT mixed indicator, magnesium atoms were titrated using an EDTA solution to determine the content of magnesium atoms in the solid catalyst component (EDTA titration method).

Content of Titanium Atoms in Solid Catalyst Component

The content of titanium atoms in the solid catalyst component was determined in accordance with the method (redox titration) specified in JIS M 8311-1997 ("Method for determination of titanium in titanium ores").

Content of Halogen Atoms in Solid Catalyst Component

The solid catalyst component from which the solvent component had been completely removed by heating (drying) under reduced pressure was weighed, and treated with a mixture of sulfuric acid and purified water to obtain an aqueous solution. A given amount of the aqueous solution was isolated preparatively, and halogen atoms were titrated with a silver nitrate standard solution using an automatic titration device ("COM-1500" manufactured by Hiranuma Sangyo Co., Ltd.) to determine the content of halogen atoms in the solid catalyst component (silver nitrate titration method).

Content of Vanadium Atoms in Solid Catalyst Component

The solid catalyst component from which the solvent component had been completely removed by heating (drying) under reduced pressure was weighed, and dissolved in a dilute sulfuric acid solution followed by adding demineralized water to adjust the amount of the solution to 100 ml. By using the vanadium-containing solution, the content of vanadium atoms in the solid catalyst component was determined with an inductively coupled plasma emission spectrophotometer (SPS-3100 manufactured by SII nanotechnology Co., Ltd.). The number of moles of vanadium compound was calculated from the inductively coupled plasma emission spectrophotometer measurement results using a calibration curve that was drawn in advance using the measurement results at a known concentration.

Content of Internal Electron Donor Compound in Solid Catalyst Component

The content of the internal electron donor compound (first internal electron donor compound, second internal electron donor compound, and third internal electron donor compound) in the solid catalyst component was determined using a gas chromatograph (GC-14B manufactured by Shimadzu Corporation) under the following conditions. The number of moles of each component (each internal electron donor compound) was calculated from the gas chromatography measurement results using a calibration curve that was drawn in advance using the measurement results at a known concentration.

Other Measurement Conditions Include:
- Column: packed column (2.6 (diameter)×2.1 m, Silicone SE-30 10%, Chromosorb WAW DMCS 80/100, manufactured by GL Sciences Ltd.)
- Detector: flame ionization detector (FID)
- Carrier gas: helium, flow rate: 40 ml/min
- Measurement temperature: vaporization chamber: 280° C., column: 225° C., detector: 280° C., or vaporization chamber: 265° C., column: 180° C., detector: 265° C.

Example 1

Synthesis of Solid Catalyst Component (A1)

(1) First Step

A 500 ml round bottom flask equipped with a stirrer in which the internal atmosphere had been sufficiently replaced by nitrogen gas, was charged with 40 ml (364 mmol) of titanium tetrachloride and 60 ml (565 mmol) of toluene to prepare a solution.

A suspension prepared using 20 g (175 mmol) of spherical diethoxymagnesium (diameter=61 μm), 80 ml (753 mmol) of toluene, and 1.8 ml (7.8 mmol) of di-n-propyl phthalate was added to the solution. The mixture was stirred at −5° C. for 1 hour, and heated to 110° C. 3.6 ml (15.5 mmol) of di-n-propyl phthalate was added stepwise to the mixture while heating the mixture. After reacting the mixture at 110° C. for 2 hours with stirring, the reaction mixture was allowed to stand, and the supernatant liquid was removed to obtain reaction product slurry.

After the addition of 187 ml of toluene (100° C.) to the reaction product slurry, the mixture was stirred and allowed to stand, and the supernatant liquid was removed. This operation was repeated four times to wash the reaction product to obtain reaction product slurry including a solid component (I).

(2) Second Step 158 ml (1487 mmol) of toluene and 30 ml (273 mmol) of titanium tetrachloride were added to the reaction product slurry including the solid component (I). The mixture was heated to 110° C., and reacted for 2 hours with stirring. After completion of the reaction, the supernatant liquid was removed. After the addition of 180 ml of toluene and 20 ml (182 mmol) of titanium tetrachloride, the mixture was heated to 80° C. After the addition of 0.5 ml (2.2 mmol) of di-n-propyl phthalate, the mixture was heated to 110° C., and reacted for 2 hours with stirring. The resulting reaction mixture was allowed to stand, and the supernatant liquid was removed to obtain reaction product slurry.

After completion of the reaction, 187 ml of toluene (100° C.) was added to the reaction product slurry, the mixture was stirred and allowed to stand, and the supernatant liquid was removed. This operation was repeated twice to wash the reaction product to obtain reaction product slurry including a solid component (II).

(3) Third Step 170 ml (1600 mmol) of toluene was added to the reaction product slurry including the solid component (II) to adjust the concentration of titanium tetrachloride in the reaction mixture to 0.2 wt %, and the mixture was heated to 80° C. After the addition of 0.5 ml (2.5 mmol) of diethyl phthalate, the mixture was reacted at 100° C. for 1 hour with stirring. The resulting reaction mixture was allowed to stand, and the supernatant liquid was removed to obtain reaction product slurry.

After the addition of 150 ml of n-heptane (60° C.) to the reaction product slurry, the mixture was stirred and allowed to stand, and the supernatant liquid was removed. This operation was repeated 7 times to wash the reaction product to obtain a solid catalyst component (a1) for olefin polymerization. The solid catalyst component (a1) had a magnesium atom content of 18.0 wt %, a titanium atom content of 2.3 wt %, a halogen atom content of 59.2 wt %, and a total phthalic diester content of 18 wt %.

(4) Forth Step 120 ml of toluene and 6.9 ml (73 mmol) of vanadium oxytrichloride were added to 15 g of the solid catalyst component (a1) and the mixture was heated to 80° C. for 1 hour with stirring. The resulting reaction mixture was allowed to stand, and the supernatant liquid was removed to obtain reaction product slurry.

After the addition of 150 ml of n-heptane (23° C.) to the reaction product slurry, the mixture was stirred and allowed to stand, and the supernatant liquid was removed. This operation was repeated 3 times to wash the reaction product to obtain a solid catalyst component (A1) for olefin polymerization. The solid catalyst component (A1) had a titanium atom content of 1.7 wt %, a vanadium atom content of 0.3 wt %, and a total phthalic diester content of 19.0 wt %.

Preparation of Ethylene Propylene Copolymerization Catalyst and Production of Impact Copolymer An autoclave (internal volume: 2.0 l) equipped with a stirrer in which the internal atmosphere had been completely replaced by nitrogen gas, was charged with 2.2 mmol of triethylaluminum, 0.22 mmol of diethylaminotriethoxysilane, and the solid catalyst component (A1) (0.37 μmol on a titanium atom basis) to prepare an ethylene-propylene copolymerization catalyst.

An autoclave equipped with a stirrer was charged with the ethylene-propylene copolymerization catalyst, and further charged with liquefied propylene (15 mol) and hydrogen gas (partial pressure: 0.20 MPa). The liquefied propylene was subjected to preliminary polymerization at 20° C. for 5 minutes, and subjected to first-step homopropylene polymerization (homopolymerization) at 70° C. for 60 minutes. The pressure inside the autoclave was then returned to normal pressure.

Before starting copolymerization step, 0.70 MPa of propylene, 0.49 MPa of ethylene, and 0.018 MPa of hydrogen and 0.8 mol of ethyl trichloroacetate were added to the autoclave. The mixture was heated to 70° C., and reacted at 70° C. for 1 hour under a pressure of 1.2 MPa while feeding ethylene, propylene, and hydrogen in a ratio of 1.6/2.4/0.093 (L/min) to obtain an ethylene-propylene copolymer. The polymerization results are shown in Table 1.

The propylene-based block copolymerization activity (ICP (impact copolymer) activity) (g-ICP/(g-cat)) and the polymerization ratio (block ratio) (wt %) of the copolymerization part were measured as described below to evaluate the sustainability of polymerization activity. The MFR of the homopolymer, the MFR of the ICP, the EPR content (propylene-α-olefin content) (wt %) in the propylene-based ICP, the ethylene content (wt %) in the EPR, the ethylene content (wt %) in the xylene-insoluble component, the flexural modulus (FM) (MPa), and the Izod impact strength (KJ/m$^2$) were also measured. The results are shown in Table 1.

ICP Polymerization Activity

The ICP copolyrnerization activity per gram of the solid catalyst component was calculated by the following expression:

ICP copolymerization activity($g$-ICP/$g$-catalyst)= ($I(g)$−$F(g)$+$J(g)$)÷[{weight($g$) of solid catalyst component in olefin polymerization catalyst× (($G(g)$−$F(g)$−$J(g)$))÷($G(g)$−$F(g)$))].

Note that I is the weight (g) of the autoclave after completion of copolymerization, "F" is the weight (g) of the autoclave, "G" is the weight (g) of the autoclave after unreacted monomers had been removed after completion of PP homopolymerization, and "J" is the amount (g) of polymer removed after homopolymerization.

Homopolymerization Activity

The homopolymerization activity per gram of solid catalyst component was calculated by the following expression: homopolymerization activity($g$-PP/$g$-catalyst)=($G(g)$−$F(g)$)÷(weight ($g$) of solid catalyst component in olefin polymerization catalyst). The variables have the same meaning as above.

Block Ratio (wt %)

Block ratio(wt %)={($I(g)$−$G(g)$+$J(g)$)÷($I(g)$−$F(g)$)}× 100.

Note that I is the weight (g) of the autoclave after completion of copolymerization, "G" is the weight (g) of the autoclave after unreacted monomers had been removed after completion of propylene homopolymerization, "J" is the amount (g) of polymer removed after homopolymerization, and "F" is the weight (g) of the autoclave.

EPR Content (Xylene-Soluble Content in ICP Polymer)

A flask equipped with a stirrer was charged with 5.0 g of the copolymer (ICP propylene polymer) and 250 ml of p-xylene. The external temperature was increased to be equal to or higher than the boiling point of xylene (about 150° C.), and the polymer was dissolved over 2 hours while maintaining p-xylene contained in the flask at the boiling point (137 to 138° C.). The solution was cooled to 23° C. over 1 hour, and an insoluble component and a soluble component were separated by filtration. A solution of the soluble component was collected, and p-xylene was evaporated by heating (drying) under reduced pressure. The weight of the residue was calculated, and the relative ratio (wt %) relative to the ICP was calculated to determine the EPR content.

Determination of Ethylene Content in EPR

A small amount of EPR (xylene-soluble component) that was extracted with xylene when determining the EPR content (xylene-soluble content in the ICP polymer) was sampled, and hot-pressed in the shape of a film. The ethylene content in the EPR was calculated from the absorbance measured using a Fourier transform infrared spectrometer (FT-IR) (Avatar™ manufactured by Thermo Nicolet) based on a calibration curve drawn using a plurality of samples having a known ethylene content. Other conditions include:
  Measurement wavelength: 720 cm$^{-1}$ and 1150 cm$^{-1}$
  Film thickness: 0.1 to 0.2 mm Ethylene Content in Xylene-Insoluble (XI) Component A small amount of the xylene-insoluble (e.g., crystalline polypropylene) component obtained by extraction with xylene was sampled, and hot-pressed in the shape of a film, and the ethylene content in the xylene-insoluble component was calculated in the same manner as the ethylene content in the EPR.

Melt Flow Rate (MFR) of Polymer

The melt flow rate (MFR) (melt flow index) (g/10 min) of homopolypropylene and the ICP polymer was measured in accordance with ASTM 01238 (JIS K 7210) using 2.16 kg and 230° C.

The Intrinsic Viscosity of EPR (IV-EPR)

The intrinsic viscosity of EPR (IV-EPR) was calculated by using following formula (Huggins equation) from the reduced viscosity ($\eta SP/c$) measured in decalin at 135° C. by means of Ubbelohde-type viscometer:

$$\eta SP/c=[\eta]+K[\eta]^2 c$$

wherein, $\eta SP/c$ (dL/g) is reduced viscosity, $[\eta]$ (dL/g) is intrinsic viscosity, "c" (g/dL) is polymer concentration, and "K" is 0.35 (Huggins constant).

Flexural Modulus (FM) of Polymer

The polymer was molded to prepare a property measurement specimen in accordance with JIS K 71 71. The specimen was conditioned in a temperature-controlled room maintained at 23° C. for 144 hours or more, and the flexural modulus (FM) (MPa) was measured using the specimen provided that a liquid/powder exudate was not observed on the surface thereof. Note that the property measurement specimen was prepared as described below. 10 wt % of Irganox™ 1010 (manufactured by BASF), 0.10 wt % of Irgafos™ 168 (manufactured by BASF), and 0.08 wt % of calcium stearate were added to the ethylene-propylene copolymer, and the mixture was kneaded and granulated using a single-screw extruder to obtain pellets of the ethylene-propylene copolymer. The pellets of the ethylene-propylene copolymer were introduced into an injection molding machine (mold temperature: 60° C., cylinder temperature: 230° C.), and injection-molded to prepare the property measurement specimen.

Izod Impact Strength

An amount of 0.10 wt % of Irganox™ 1010 (manufactured by BASF), 0.10 wt % of Irgafos™ 168 (manufactured by BASF), and 0.08 wt % of calcium stearate were added to the ethylene-propylene copolymer, and the mixture was kneaded and granulated using a single-screw extruder to obtain pellets of the ethylene-propylene copolymer. The pellets of the ethylene-propylene copolymer were introduced into an injection molding machine (mold temperature: 60° C., cylinder temperature: 230° C.), and injection-molded to prepare a property measurement specimen. The specimen was conditioned in a temperature-controlled room maintained at 23° C. for 144 hours or more, and the Izod impact strength of the specimen was measured in accordance with JIS K 7110 ("Method of Izod Impact Test For Rigid Plastics") using an Izod tester (Model A-121804405 manufactured by Toyo Seiki Seisaku-Sho, Ltd.). Other conditions are as follows:
  Shape of specimen: ISO 180/4A, thickness: 3.2 mm, width: 12.7 mm, length: 63.5 mm
  Shape of notch: type-A notch (radius: 0.25 mm) formed using a die provided with a notch
  Temperature: 23° C. and −30° C.
  Impact speed: 3.5 m/s
  Nominal pendulum energy: 0.5 J (23° C.) and 0.5 J (−30° C.).

Molecular Weight and Molecular Weight Distribution of Polymer

The molecular weight and molecular weight distribution (Mw/Mn) of the polymers were measured by gel permeation chromatography (GPC) (GPCHLC-8321 GPC/HT manufactured by Toso) under the following conditions. The molecular weight distribution of the polymer was evaluated by the ratio "Mw/Mn" of the weight average molecular weight (Mw) to the number average molecular weight (Mn). Other conditions are as follows:
Solvent: o-dichlorobenzene (ODCB)+BHT0.1%
Temperature: 140° C. (SEC)
Column: GMHHR-H(20)×1 and GMHHR-H(S)HT2×1
Sample concentration: 0.5 mg/ml (ODCB)
Sample amount: 0.5 ml
Carrier solvent flow rate: 1.0 ml/min Example 2

Synthesis of Solid Catalyst Component (A2)
According to the example 1, catalyst component (a1) was prepared in the same manner, except that fourth step was not carried out. A 100 ml glass bottle was placed in the plastic bag in which the internal atmosphere had been sufficiently replaced by nitrogen gas. Catalyst component (A1) was added to the glass bottle. Mixture solution of 0.23 ml of $VOCl_3$ and 0.23 ml of heptane was added to the catalyst component (A1) followed by shaking the bottle for 10 minutes and letting it stand for 30 minutes to disperse the mixture solution homogeneously over the catalyst component (A1). This operation was repeated 3 times to obtain a solid catalyst component (A2) for olefin polymerization. The solid catalyst component (A2) had a titanium content of 1.7 wt %, a vanadium atom content of 0.3 wt %, and total phthalic diester content of 16.6 wt %.
Preparation of Ethylene Propylene Copolymerization Catalyst and Production of Impact Copolymer
A polymerization catalyst (B2) was prepared and evaluated in the same manner as example 1, except that the solid catalyst component (A2) was used instead of the solid catalyst (A1). The polymerization results are shown in Table 1.

Example 3

Synthesis of Solid Catalyst Component (A3)
A solid catalyst component (A3) was prepared in the same manner as example 1, except that 120 ml of toluene and 0.8 ml (7.3 mmol) of vanadium tetrachloride were added to 15 g of the solid catalyst component (a1) at fourth step. The solid catalyst component (A3) had a titanium atom content of 1.1 wt %, a vanadium atom content of 1.6 wt %, and a total phthalic diester content of 19.1 wt %.
Preparation of Ethylene Propylene Copolymerization Catalyst and Production of Impact Copolymer
A polymerization catalyst (B3) was prepared and evaluated in the same manner as example 1, except that the solid catalyst component (A3) was used instead of the solid catalyst (A1). The polymerization results are shown in Table 1.

Example 4

Preparation of Ethylene Propylene Copolymerization Catalyst and Production of Impact Copolymer
A polymerization catalyst (B3) was prepared and evaluated in the same manner as example 3, except that no ethyl trichloroacetate was added to the reactor before copolymerization and the copolymerization was carried out at 60° C. The polymerization results are shown in Table 1.

Example 5

Preparation of Ethylene Propylene Copolymerization Catalyst and Production of Impact Copolymer
A polymerization catalyst (B3) was prepared and evaluated in the same manner as example 3, except that the copolymerization was carried out at 45° C. The polymerization results are shown in Table 1.

Example 6

Preparation of Ethylene Propylene Copolymerization Catalyst and Production of Impact Copolymer
A polymerization catalyst (B3) was prepared and evaluated in the same manner as example 3, except that 0.8 µmol of monochlorocyclohexane was added to the reactor instead of ethyl trichloroacetate before copolymerization and the copolymerization was carried out at 45° C. The polymerization results are shown in Table 1.

Example 7

Preparation of Ethylene Propylene Copolymerization Catalyst and Production of Impact Copolymer
A polymerization catalyst (B3) was prepared and evaluated in the same manner as example 3, except that no ethyl trichloroacetate was added to the reactor before copolymerization and the copolymerization was carried out at 45° C. The polymerization results are shown in Table 1.

Example 8

Preparation of Ethylene Propylene Copolymerization Catalyst and Production of Impact Copolymer
A polymerization catalyst (B3) was prepared in the same manner as example 3. An autoclave equipped with a stirrer was charged with the ethylene-propylene copolymerization catalyst, and further charged with liquefied propylene (15 mol) and hydrogen gas (partial pressure: 0.20 MPa). The liquefied propylene was subjected to preliminary polymerization at 20° C. for 5 minutes, and subjected to first-step homopropylene polymerization (homopolymerization) at 70° C. for 60 minutes. The pressure inside the autoclave was then returned to normal pressure.
Before starting copolymerization step, 0.70 MPa of propylene, 0.49 MPa of ethylene, and 0.010 MPa of hydrogen were added to the autoclave. The mixture was heated to 60° C., and reacted at 60° C. for 1 hour under a pressure of 1.2 MPa while feeding ethylene, propylene, and hydrogen in a ratio of 1.6/2.4/0.015 (L/min) to obtain an ethylene-propylene copolymer.

Example 9

Synthesis of Solid Catalyst Component (A4)
A solid catalyst component (A4) was prepared in the same manner as example 2, except that mixture solution of 0.26 ml of $VCl_4$ and 0.26 ml of heptane was added to the catalyst component (a1). The solid catalyst component (A4) had a titanium content of 2.0 wt %, a vanadium atom content of 2.0 wt %, and total phthalic diester content of 16.5 wt %.
Preparation of Ethylene Propylene Copolymerization Catalyst and Production of Impact Copolymer
A polymerization catalyst (B4) was prepared and evaluated in the same manner as example 8, except that the solid catalyst component (A4) was used instead of the solid catalyst (A3) and no ethyl trichloroacetate was added to the reactor before copolymerization. The polymerization results are shown in Table 1.

Example 10

Synthesis of Solid Catalyst Component (A5)

A solid catalyst component (A5) was prepared in the same manner as example 1, except that 20 g (175 mmol) of spherical diethoxymagnesium (diameter=43 μm) was used at first step.

Preparation of Ethylene Propylene Copolymerization Catalyst and Production of Impact Copolymer A polymerization catalyst (B5) was prepared and evaluated in the same manner as example 8, except that the solid catalyst component (A5) was used instead of the solid catalyst (A3). The polymerization results are shown in Table 1.

Example 11

Synthesis of Solid Catalyst Component (A6)
Preparation of Solid Catalyst Component
(1) First Step A 500 ml round bottom flask equipped with a stirrer in which the internal atmosphere had been sufficiently replaced by nitrogen gas, was charged with 40 ml (364 mmol) of titanium tetrachloride and 60 ml (565 mmol) of toluene to prepare a solution.

A suspension prepared using 20 g (175 mmol) of spherical diethoxymagnesium (diameter=61 μm), 80 ml (753 mmol) of toluene, and 1.8 ml (7.8 mmol) of di-n-propyl phthalate was added to the solution. The mixture was stirred at −5° C. for 1 hour, and heated to 110° C. 3.6 ml (15.5 mmol) of di-n-propyl phthalate was added stepwise to the mixture while heating the mixture. After reacting the mixture at 100° C. for 3 hours with stirring, the reaction mixture was allowed to stand, and the supernatant liquid was removed to obtain reaction product slurry.

After the addition of 187 ml of toluene (100° C.) to the reaction product slurry, the mixture was stirred and allowed to stand, and the supernatant liquid was removed. This operation was repeated four times to wash the reaction product to obtain reaction product slurry including a solid component (I).

(2) Second Step 60 ml of toluene, 45 ml of titanium tetrachloride and 5.5 ml of vanadium tetrachloride were added to the reaction product slurry including the solid component (I). The mixture was heated to 110° C., and reacted for 2 hours with stirring. After completion of the reaction, the supernatant liquid was removed. After the addition of 180 ml of toluene and 20 ml (182 mmol) of titanium tetrachloride, the mixture was heated to 80° C. After the addition of 0.5 ml (2.2 mmol) of di-n-propyl phthalate, the mixture was heated to 110° C., and reacted for 2 hours with stirring. The resulting reaction mixture was allowed to stand, and the supernatant liquid was removed to obtain reaction product slurry.

After completion of the reaction, 187 ml of toluene (100° C.) was added to the reaction product slurry, the mixture was stirred and allowed to stand, and the supernatant liquid was removed. This operation was repeated twice to wash the reaction product to obtain reaction product slurry including a solid component (II).

(3) Third Step 170 ml (1600 mmol) of toluene was added to the reaction product slurry including the solid component (II) to adjust the concentration of titanium tetrachloride in the reaction mixture to 0.2 wt %, and the mixture was heated to 80° C. After the addition of 0.5 ml (2.5 mmol) of diethyl phthalate, the mixture was reacted at 100° C. for 1 hour with stirring. The resulting reaction mixture was allowed to stand, and the supernatant liquid was removed to obtain reaction product slurry.

After the addition of 150 ml of n-heptane (60° C.) to the reaction product slurry, the mixture was stirred and allowed to stand, and the supernatant liquid was removed. This operation was repeated 7 times to wash the reaction product to obtain a solid catalyst component (A6) for olefin polymerization. The solid catalyst component (A6) had a titanium atom content of 0.4 wt %, a vanadium atom content of 6.7 wt %, and a total phthalic diester content of 15.9 wt %.

Preparation of Ethylene Propylene Copolymerization Catalyst and Production of Impact Copolymer A polymerization catalyst (B6) was prepared and evaluated in the same manner as example 8, except that the solid catalyst component (A6) was used instead of the solid catalyst (A3). The polymerization results are shown in Table 1.

Example 12

Synthesis of Solid Catalyst Component (A7)

A solid catalyst component (A7) was prepared in the same manner as example 11, except that 60 ml of toluene, 49 ml of titanium tetrachloride and 1 ml of vanadium tetrachloride was added at the second step. The solid catalyst component (A7) had a titanium atom content of 1.5 wt %, a vanadium atom content of 0.8 wt %, and a total phthalic diester content of 19.8 wt %.

Preparation of Ethylene Propylene Copolymerization Catalyst and Production of Impact Copolymer A polymerization catalyst (B7) was prepared and evaluated in the same manner as example 8, except that the solid catalyst component (A7) was used instead of the solid catalyst (A3). The polymerization results are shown in Table 1.

Example 13

Synthesis of Solid Catalyst Component (A8)

A 500 ml round bottom flask equipped with a stirrer in which the internal atmosphere had been sufficiently replaced by nitrogen gas, was charged with 20 g of diethoxymagnesium (diameter=43 μm), 110 ml of toluene, 40 ml of titanium tetrachloride. The mixture was heated to 60° C. After the addition of 8.2 ml (30.6 mmol) of diethyl diisopropylsuccinate, the mixture was heated to 100° C., and reacted for 2 hours with stirring. The resulting reaction mixture was allowed to stand, and the supernatant liquid was removed to obtain reaction product slurry.

After completion of the reaction, 90 ml of toluene (100° C.) was added to the reaction product slurry, the mixture was stirred and allowed to stand, and the supernatant liquid was removed. This operation was repeated 6 times to wash the reaction product to obtain reaction product slurry including a solid component.

100 ml of toluene and 20 ml of titanium tetrachloride were added to the reaction product slurry including the solid component. The mixture was heated to 100° C., and reacted for 15 minutes with stirring. After completion of the reaction, the supernatant liquid was removed. This operation was repeated 3 times followed by the addition of 150 ml of n-heptane (40° C.) to the reaction product slurry, the mixture was stirred and allowed to stand, and the supernatant liquid was removed. This operation was repeated 6 times to wash the reaction product to obtain a solid catalyst component for olefin polymerization.

80 ml of toluene and 0.5 ml of vanadium tetrachloride were added to 10 g of the solid catalyst component and the mixture was heated to 80° C. for 1 hour with stirring. The resulting reaction mixture was allowed to stand, and the supernatant liquid was removed to obtain reaction product slurry.

After the addition of 100 ml of n-heptane (23° C.) to the reaction product slurry, the mixture was stirred and allowed to stand, and the supernatant liquid was removed. This operation was repeated 3 times to wash the reaction product to obtain a solid catalyst component (A8) for olefin polymerization.

The solid catalyst component (A8) had a titanium atom content of 1.0 wt %, a vanadium atom content of 2.1 wt %, and a diethyl diisopropylsuccinate content of 19.8 wt %.

Preparation of Ethylene Propylene Copolymerization Catalyst and Production of Impact Copolymer A polymerization catalyst (B8) was prepared and evaluated in the same manner as example 8, except that the solid catalyst component (A8) was used instead of the solid catalyst (A3). The polymerization results are shown in Table 1.

Comparative Catalyst Example 1

Synthesis of Solid Catalyst Component (A9)

A solid catalyst component (A9) was prepared in the same manner as example 1, except that fourth step was not carried out.

Preparation of Ethylene Propylene Copolymerization Catalyst and Production of Impact Copolymer A polymerization catalyst (B9) was prepared and evaluated in the same manner as example 3, except that the solid catalyst component (A9) was used instead of the solid catalyst (A3) and no ethyl trichloroacetate was added to the reactor before copolymerization. The polymerization results are shown in Table 1.

Comparative Catalyst Example 2

Preparation of Ethylene Propylene Copolymerization Catalyst and Production of Impact Copolymer A polymerization catalyst (B9) was prepared and evaluated in the same manner as comparative example 1, except that copolymerization was carried out at 60° C. The polymerization results are shown in Table 1.

Comparative Catalyst Example 3

Preparation of Ethylene Propylene Copolymerization Catalyst and Production of Impact Copolymer A polymerization catalyst (B9) was prepared and evaluated in the same manner as comparative example 1, except that copolymerization was carried out at 45° C. The polymerization results are shown in Table 1.

Comparative Catalyst Example 4

Preparation of Ethylene Propylene Copolymerization Catalyst and Production of Impact Copolymer A polymerization catalyst (B9) was prepared and evaluated in the same manner as example 8, except that the solid catalyst component (A9) was used instead of the solid catalyst (A3). The polymerization results are shown in Table 1.

It was found that the ICP produced from the comparative catalysts was similar to that of the inventive ICP examples. Thus, the "comparative" examples made alternative embodiments of the ICP.

TABLE 1

| | ICP's made using inventive catalysts | | | | | | | | | |
|---|---|---|---|---|---|---|---|---|---|---|
| | Yield | | | | EPR | Ethylene content | | | | Izod |
| example | Bulk-Homo g/g-cat | Gas-ICP g/g-cat | Impact Ratio, % | MFR, g/10 min | Content, wt % | in EPR, % | in xylene insoluble, % | IV-EPR dL/g | Flex Mod, MPa | ($-30°$ C.) kJ/m$^2$ |
| 1 | 35,700 | 7,900 (60 min) | 18.1 | 160 (Homo) 59 (ICP) | 16.0 | 42.9 | 3.1 | 2.9 | 1,250 | 4.6 |
| 2 | 32,800 | 7,200 (60 min) | 18.0 | 180 (Homo) 65 (ICP) | 14.7 | 43.4 | 3.6 | 3.2 | 1,250 | 4.1 |
| 3 | 23,300 | 3,600 (60 min) | 13.3 | 150 (Homo) 65 (ICP) | 12.6 | 42.0 | 2.1 | 3.1 | 1,380 | 3.8 |
| 4 | 21,500 | 3,100 (30 min) | 12.6 | 130 (Homo) 67 (ICP) | 10.8 | 41.0 | 2.2 | 3.7 | 1,420 | 3.6 |
| 5 | 21,800 | 3,500 (45 min) | 14.0 | 140 (Homo) 52 (ICP) | 10.9 | 41.9 | 3.2 | 4.6 | 1,390 | 4.4 |
| 6 | 21,100 | 3,900 (45 min) | 15.6 | 140 (Homo) 47 (ICP) | 11.9 | 42.6 | 3.0 | 4.6 | 1,360 | 4.7 |
| 7 | 21,700 | 3,500 (45 min) | 13.9 | 150 (Homo) 55 (ICP) | 11.1 | 41.6 | 2.8 | 4.3 | 1,410 | 4.2 |
| 8 | 20,000 | 2,100 (30 min) | 9.6 | 140 (Homo) 56 (ICP) | 8.8 | 40.5 | 2.2 | 6.1 | 1,450 | 3.8 |
| 9 | 31,000 | 5,800 (60 min) | 15.7 | 170 (Homo) 71 (ICP) | 13.6 | 43.8 | 3.9 | 3.3 | 1,290 | 3.6 |
| 10 | 24,500 | 2,800 (30 min) | 10.3 | 120 (Homo) 52 (ICP) | 7.8 | 42.5 | 2.1 | 5.9 | 1,510 | 3.6 |
| 11 | 8,500 | 1,000 (30 min) | 10.3 | 130 (Homo) 63 (ICP) | 9.1 | 42.3 | 2.1 | 5.8 | 1,410 | 4.3 |
| 12 | 19,100 | 1,900 (30 min) | 9.0 | 140 (Homo) 60 (ICP) | 7.5 | 40.4 | 2.1 | 6.4 | 1,500 | 3.6 |
| 13 | 15,500 | 800 (30 min) | 4.7 | 42 (Homo) 23 (ICP) | 7.1 | 42.9 | 1.9 | 6.5 | 1,630 | 3.2 |

TABLE 2

ICP's made using comparative catalyst

| example | Yield Bulk-Homo g/g-cat | Yield Gas-ICP g/g-cat | Impact Ratio, % | MFR, g/10 min | EPR Content, wt % | Ethylene content in EPR, % | Ethylene content In xylene insoluble, % | IV-EPR dL/g | Flex Mod, MPa | Izod (−30° C.) kJ/m² |
|---|---|---|---|---|---|---|---|---|---|---|
| 1 | 35,400 | 5,600 (40 min) | 13.7 | 180 (Homo) 72 (ICP) | 11.8 | 43.4 | 2.5 | 3.1 | 1,420 | 3.6 |
| 2 | 39,300 | 6,400 (40 min) | 14.0 | 190 (Homo) 73 (ICP) | 12.0 | 41.3 | 2.5 | 3.3 | 1,360 | 3.7 |
| 3 | 40,500 | 7,200 (60 min) | 15.1 | 170 (Homo) 60 (ICP) | 12.0 | 40.1 | 3.1 | 3.8 | 1,310 | 4.4 |
| 4 | 34,200 | 3,300 (30 min) | 8.7 | 170 (Homo) 81 (ICP) | 7.7 | 39.7 | 2.0 | 5.7 | 1,510 | 3.2 |

As is clear from the results shown in Table 1, the olefin polymerization catalysts respectively prepared using the solid catalyst components obtained in Examples 1 to 13 achieved high second-step copolymerization activity when implementing multistep copolymerization. A large amount of ethylene was introduced into the propylene-ethylene copolymer, and excellent sustainability of olefin polymerization was achieved during copolymerization. Ethylene was efficiently introduced into the propylene-α-olefin copolymer part, and a good balance between rigidity and impact strength was achieved.

As used herein, "consisting essentially of" means that the claimed ICP includes only the named components and no additional components that will alter its measured properties by any more than 10 or 20%; and most preferably means that additional components or "additives" are present to a level of less than 5, or 4, or 3, or 2 wt % by weight of the composition. Such additives can include, for example, fillers, colorants, antioxidants, alkyl-radical scavengers, anti-UV additives, acid scavengers, slip agents, curatives and cross-linking agents, aliphatic and/or cyclic containing oligomers or polymers (sometimes referred to as "hydrocarbon resins"), and other additives well known in the art.

As it relates to a process, the phrase "consisting essentially of" means that there are no other process features that will alter the claimed properties of the polymer, polymer blend or article produced therefrom by any more than 10 or 20%.

For all jurisdictions in which the doctrine of "incorporation by reference" applies, all of the test methods, patent publications, patents and reference articles are hereby incorporated by reference either in their entirety or for the relevant portion for which they are referenced.

The invention claimed is:

1. A polypropylene having a melt flow rate (MFR, 230° C., 2.16 kg) of at least 20 g/10 min comprising a homopolypropylene and within a range from 2 wt % to 40 wt % of a propylene-α-olefin copolymer by a weight of the polypropylene; wherein the homopolypropylene has a MFR within a range from 30 g/10 min to 200 g/10 min; and the propylene-α-olefin copolymer comprises within a range from 30 wt % to 50 wt % α-olefin derived units by weight of the propylene-α-olefin copolymer, in which at least a portion of the α-olefin derived units are derived from ethylene, and the propylene-α-olefin copolymer has an intrinsic viscosity within a range from 4 to 9 dL/g, and a xylene-insoluble portion of the propylene-α-olefin copolymer has an ethylene content of 3.0 wt % or less relative to a total amount of the propylene-α-olefin copolymer.

2. The polypropylene of claim 1, wherein the homopolypropylene has a flexural modulus of at least 1800 MPa.

3. The polypropylene of claim 1, wherein the α-olefin derived units are derived from ethylene and at least one C4 to C8 α-olefin.

4. The polypropylene of claim 1, wherein the homopolypropylene has a weight average molecular weight (Mw) within a range from 150,000 g/mole to 400,000 g/mole.

5. The polypropylene of claim 1, wherein the homopolypropylene has a z-average molecular weight (Mz) of at least 1,100 kg/mole.

6. The polypropylene of claim 1, wherein the homopolypropylene has an Mz/Mn value within a range from 70 to 160.

7. The polypropylene of claim 1, wherein the homopolypropylene comprises two homopolypropylene components having different MFRs.

8. The polypropylene of claim 1, wherein the polypropylene has a flexural modulus of at least 1400 MPa.

9. The polypropylene of claim 1, wherein the polypropylene has an Izod impact strength (−30° C.) of at least 3 kJ/m².

10. The polypropylene of claim 1, wherein the polypropylene is obtained by combining a Ziegler-Natta catalyst with propylene in two slurry reactors in series to produce the homopolypropylene, followed by combining the homopolypropylene and the Ziegler-Natta catalyst with propylene and at least one α-olefin in a gas phase reactor to produce the propylene-α-olefin copolymer blended with the homopolypropylene.

11. The polypropylene of claim 10, wherein the Ziegler-Natta catalyst comprises titanium and vanadium.

12. The polypropylene of claim 11, wherein the Ziegler-Natta catalyst comprises a dialkyl- and/or dialkoxymagnesium support having an average particle size within a range from 5 μm to 120 μm.

13. An automotive component comprising the polypropylene of claim 1.

14. A polypropylene with a melt flow rate (MFR, 230° C., 2.16 kg) within a range from 40 g/10 min to 100 g/10 min consisting essentially of a homopolypropylene and within a range from 10 wt % to 16 wt % of an ethylene-propylene copolymer (EPR) by weight of the polypropylene; wherein the homopolypropylene has a MFR within a range from 70 g/10 min to 200 g/10 min; and the EPR comprises within a range from 30 wt % to 50 wt % ethylene derived units by weight of the EPR, and has an intrinsic viscosity within a range from 4 to 8 dL/g; and the polypropylene is obtained by combining a Ziegler-Natta catalyst with propylene in two slurry reactors in series to produce the homopolypropylene, followed by combining the homopolypropylene and the Ziegler-Natta catalyst with propylene and ethylene in a gas phase reactor to produce the EPR blended with the homopolypropylene, wherein the Ziegler-Natta catalyst comprises titanium and vanadium.

\* \* \* \* \*